(12) United States Patent
Buzzard et al.

(10) Patent No.: US 12,122,445 B2
(45) Date of Patent: Oct. 22, 2024

(54) TELESCOPIC UNLOCKING MECHANISM

(71) Applicant: Steering Solutions IP Holding Corporation, Saginaw, MI (US)

(72) Inventors: Donald A. Buzzard, Saginaw, MI (US); Michael P. Anspaugh, Saginaw, MI (US); Floyd E. Eschenbacher, Saginaw, MI (US); Kirk D. Potts, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 18/204,007

(22) Filed: May 31, 2023

(65) Prior Publication Data

US 2024/0208563 A1    Jun. 27, 2024

Related U.S. Application Data

(63) Continuation-in-part of application No. 18/087,992, filed on Dec. 23, 2022, now Pat. No. 11,891,111.

(51) Int. Cl.
*B62D 1/184* (2006.01)
*B62D 1/185* (2006.01)
*B62D 1/187* (2006.01)

(52) U.S. Cl.
CPC ............. *B62D 1/184* (2013.01); *B62D 1/185* (2013.01); *B62D 1/187* (2013.01)

(58) Field of Classification Search
CPC ......... B62D 1/184; B62D 1/185; B62D 1/187
See application file for complete search history.

(56) References Cited

U.S. PATENT DOCUMENTS

| | | | |
|---|---|---|---|
| 9,393,986 B1 * | 7/2016 | Anspaugh | B62D 1/184 |
| 9,428,211 B2 * | 8/2016 | Vermeersch | B62D 1/19 |
| 9,764,757 B2 * | 9/2017 | Buzzard | B62D 1/184 |
| 11,753,065 B1 * | 9/2023 | Soderlind | B62D 1/181 |
| | | | 74/493 |
| 11,891,111 B1 * | 2/2024 | Buzzard | B62D 1/184 |
| 2015/0266499 A1 * | 9/2015 | Yoshihara | B62D 1/184 |
| | | | 74/493 |
| 2018/0362069 A1 * | 12/2018 | Sugiura | B62D 1/184 |
| 2022/0266890 A1 * | 8/2022 | Buzzard | B62D 1/195 |

FOREIGN PATENT DOCUMENTS

| | | | | |
|---|---|---|---|---|
| CN | 109080693 A | * | 12/2018 | ............. B62D 1/184 |
| DE | 102018128119 A1 | * | 5/2020 | ............. B62D 1/184 |
| JP | 2004262433 A | * | 9/2004 | ............. B62D 1/184 |

* cited by examiner

*Primary Examiner* — Drew J Brown
(74) *Attorney, Agent, or Firm* — Dickinson Wright PLLC

(57) ABSTRACT

A locking cam for an axially adjustable steering column, the locking cam including: a hub; a leg extending from the hub in a first direction, the leg defining a set of teeth; and an arm extending from the hub to define a space between the arm and the leg. The arm includes an interface surface facing the leg, the interface surface interfacing with a mechanism of the adjustable steering column to pivot the locking cam. Each of the hub, the arm, and the leg are formed of a single, monolithic one-piece structure.

5 Claims, 10 Drawing Sheets

TELESCOPIC UNLOCKING MECHANISM

CROSS-REFERENCE TO RELATED APPLICATION

The present disclosure claims the benefit of Utility patent application Ser. No. 18/087,992, filed on Dec. 23, 2022 and entitled "TELESCOPIC UNLOCKING MECHANISM", the contents of which are incorporated by reference in its entirety.

TECHNICAL FIELD

The following description relates to locking mechanisms and, more particularly, to a locking mechanism for a steering column assembly.

BACKGROUND

A vehicle, such as a car, truck, sport utility vehicle, crossover, mini-van, marine craft, aircraft, all-terrain vehicle, recreational vehicle, or other suitable vehicles, include various steering system schemes, for example, steer-by-wire and driver interface steering. These steering system schemes typically include a steering column for translating steering input to an output that interacts with a steering linkage to ultimately cause the vehicle wheels (or other elements) to turn the vehicle. Some steering columns are axially adjustable between positions to provide flexibility in the location of the hand wheel and facilitate more comfortable driving positions for different sizes of drivers or autonomous driving capability. Many axially adjustable steering columns further include rake actuators that permit tilt movement around one or more pivot points. Telescopic steering columns with both rake and axial movement can require a large amount of space to operate in the underlying structure.

In addition to providing adjustability, axially adjustable steering column assemblies may also include a collapsible functionality that provides safety advantages during an energy absorption event. A locking mechanism is oftentimes required to maintain a moveable portion of the steering column assembly at a desired position after axial adjustment. One type of commonly used locking mechanism in the automotive industry is called a telescoping positive lock mechanism. When designing a telescoping positive lock mechanism, attention must be taken to allow for proper column locked and unlocked conditions. The unlocked condition must ensure for the allowance of full telescopic/axial range of adjustment. When the steering column assembly is locked, the steering column assembly must maintain a fixed telescopic/axial position while under normal vehicle operating conditions. However, during a collapse event various measures may be implemented to ensure a required collapse condition and/or range of motion while within a range applied load.

Accordingly, there is a continuing need to improve the operational framework of locking mechanisms to improve upon packaging, load requirements, and dependability.

SUMMARY

According to one aspect of the disclosure, a locking cam for an axially adjustable steering column, the locking cam including: a hub; a leg extending from the hub in a first direction, the leg defining a set of teeth; and an arm extending from the hub to define a space between the arm and the leg. The arm includes an interface surface facing the leg, the interface surface interfacing with a mechanism of the adjustable steering column to pivot the locking cam. Each of the hub, the arm, and the leg are formed of a single, monolithic one-piece structure.

According to another aspect of the disclosure, a locking mechanism for an axially adjustable steering column having an adjustment lever, the locking mechanism including a locking cam and a pin. The locking cam includes a hub defining an opening extending around an axis, a leg extending from the hub in a first direction, the leg defining a set of teeth, and an arm extending from the hub at least partially in a direction of extension of the axis to define a space between the arm and the leg. The arm includes an interface surface facing the leg, the interface surface interfacing with the adjustment lever to move the locking cam between a locked position and an unlocked position. Each of the hub, the arm, and the leg are formed of a single, monolithic one-piece structure. The pin extends through the opening in the hub to allow the locking cam to pivot about the pin between the locked position and the unlocked position. In the locked position, the set of teeth of the leg engage with a set of teeth of the axially adjustable steering column. In the unlocked position, the set of teeth of the leg are spaced apart from the set of teeth of the axially adjustable steering column.

According to yet another aspect of the disclosure, an axially adjustable steering column assembly including: a first jacket and a second jacket, the second jacket axially moveable relative to the first jacket; a first set of teeth coupled to one of the first jacket and the second jacket; an adjustment lever pivotable between a locked position and an unlocked position, the adjustable lever including a tab; and a locking mechanism. The locking mechanism includes: a pin and a locking cam including a hub, a leg extending from the hub in a first direction, the leg defining a set of teeth, and an arm extending from the hub to define a space between the arm and the leg. The arm includes an interface surface facing the leg, the interface surface interfacing with the adjustment lever to move the locking cam between a locked position and an unlocked position. Each of the hub, the arm, and the leg are formed of a single, monolithic one-piece structure. The pin extends through the locking cam to allow the locking cam to pivot about the pin between the locked position and the unlocked position. In the locked position, the second set of teeth engage with the first set of teeth. In the unlocked position, the second set of teeth are spaced apart from the first set of teeth. The tab of the adjustment lever extends into the space between the arm and the leg of the locking mechanism to contact the interface surface and move the locking mechanism from the locked position to the unlocked position.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
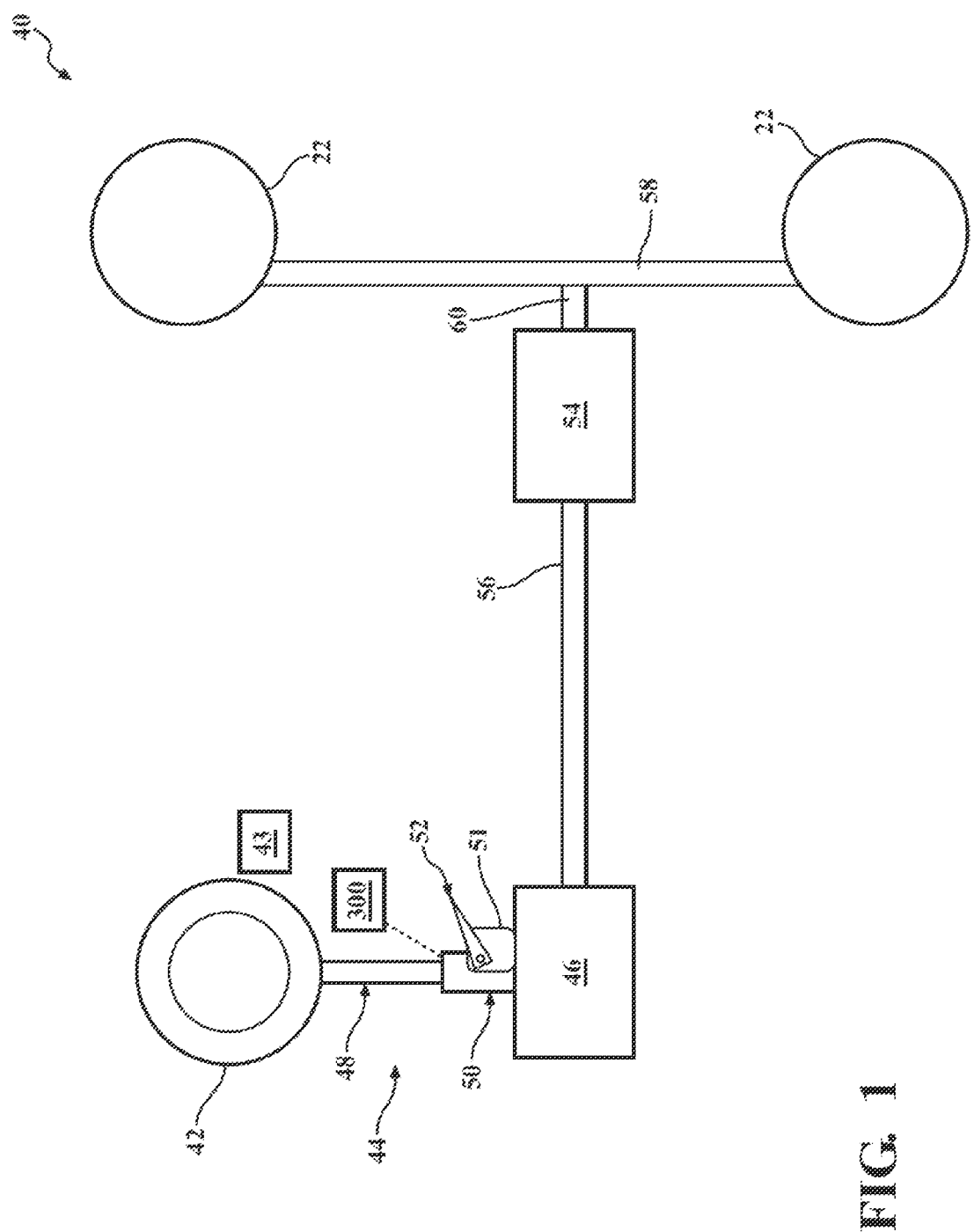
FIG. 1 schematically depicts a steering system including an adjustable steering column assembly according to the principles of the present disclosure.

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, a vehicle, such as a car, truck, sport utility vehicle, crossover, mini-van, marine craft, aircraft, all-terrain vehicle, recreational vehicle, or other suitable vehicles, include various steering system schemes, for example, steer-by-wire and driver interface steering. These steering system schemes typically include a steering column for translating steering input to an output that interacts with a steering linkage to ultimately cause the vehicle wheels (or other elements) to turn the vehicle. Some steering columns are axially adjustable between positions to provide flexibility in the location of the hand wheel and facilitate more comfortable driving positions for different sizes of drivers or autonomous driving capability. Many axially adjustable steering columns further include rake actuators that permit tilt movement around one or more pivot points. Telescopic steering columns with both rake and axial movement can require a large amount of space to operate in the underlying structure.

In addition to providing adjustability, axially adjustable steering column assemblies may also include a collapsible functionality that provides safety advantages during an energy absorption event. A locking mechanism is oftentimes required to maintain a moveable portion of the steering column assembly at a desired position after axial adjustment. One type of commonly used locking mechanism in the automotive industry is called a telescoping positive lock mechanism. When designing a telescoping positive lock mechanism, attention must be taken to allow for proper column locked and unlocked conditions. The unlocked condition must ensure for the allowance of full telescopic/axial range of adjustment. When the steering column assembly is locked, the steering column assembly must maintain a fixed telescopic/axial position while under normal vehicle operating conditions. However, during a collapse event various measures may be implemented to ensure a required collapse condition and/or range of motion while within a range applied load.

Referring now to the drawings, where the various embodiments are shown and described herein, without limiting same, FIGS. 1-7 illustrate embodiments of a steering column assembly that is axially adjustable and includes a locking mechanism with improved dependability and other operational benefits. The axial adjustability can result from relative movement between two or more jackets that permit axial movement therebetween. For example, a first jacket and a second jacket move in a relative telescopic, sliding, or translational configuration.

Referring initially to FIG. 1, a steering system 40 for a vehicle is generally illustrated according to the principles of the present disclosure. The vehicle may include any suitable vehicle, such as a car, a truck, a sport utility vehicle, a mini-van, a crossover, any other passenger vehicle, any suitable commercial vehicle, or any other suitable vehicle. Moreover, principles of the present disclosure may apply to other vehicles, such as planes, boats, trains, drones, or other suitable vehicles.

The steering system 40 may be configured as a driver interface steering system, an autonomous driving system, or a system that allows for both driver interface and autonomous steering. The steering system may include an input device 42, such as a steering wheel, wherein a driver may mechanically provide a steering input by turning the steering wheel. An airbag device 43 may be located on or near the input device 42. A steering column assembly 44 extends along an axis from the input device 42 to an output assembly 46. The output assembly 46 may include a pinion shaft assembly, an I-shaft, a cardan joint, steer-by-wire components or any other features conventionally located opposite the input device 42. The steering column assembly 44 may include at least two axially adjustable parts, for example, a first jacket 48 and a second jacket 50 that are axially adjustable with respect to one another. The first jacket 48 and the second jacket 50 may be alternatively configured as brackets, rails, or other members that permit axial movement therebetween. The axial movement may include sliding, telescopic, translating, and other axial movements. The steering column assembly 44 may include a bracket 51 that at least partially connects the steering column to the vehicle 10. An adjustable lever 52 may be operably connected to one of the first jacket 48, the second jacket 50, or the bracket 51 to facilitate axial or tilting adjustment of the steering column assembly 44. In some embodiments, behavior of the adjustable lever 52 may be controlled via a control system 300 including a CPU unit. In some embodiments, behavior of the adjustable lever 52 may be controlled manually.

The steering column assembly 44 is moveable between a range of positions from an extended position to a retracted position. In the extended position, the first jacket 48 and second jacket 50 are moved axially away from each other so that the input device 42 is located near an operator of the vehicle. In the retracted position, the first jacket 48 and second jacket 50 are moved axially towards each other so that the input device 42 is located away from an operator of the vehicle. In some embodiments, the retracted position may correspond to stowing the input device 42. For example, it may be beneficial to place the input device 42 in a stowed location during autonomous driving. In some embodiments, the retracted position can be on the order of about 150 mm away from the extended position, such as at least 100 mm, or at least about 125 mm away from the extended position. In some embodiments, the adjustable lever 52 effectuates axial movement between the first jacket 48 and second jacket 50 to adjustment between the extended position and the retracted position. In some embodiments, the adjustable lever 52 effectuates rake or tilt movement of the steering column assembly 44.

A steering gear assembly 54 may connect to the output assembly 46 via a steering gear input shaft 56. The steering gear assembly 54 may be configured as a rack-and-pinion, a recirculating ball-type steering gear, or any other types of steering gears associated with autonomous and driver-interface steering systems. The steering gear assembly 54 may then connect to a driving axle 58 via an output shaft 60. The output shaft 60 may include a pitman arm and sector gear or other traditional components. The output shaft 60 is operably connected to the steering gear assembly 54 such that a rotation of the steering gear input shaft 56 causes a responsive movement of the output shaft 60 and causes the drive axle to turn the wheels 22.

Figure 2:
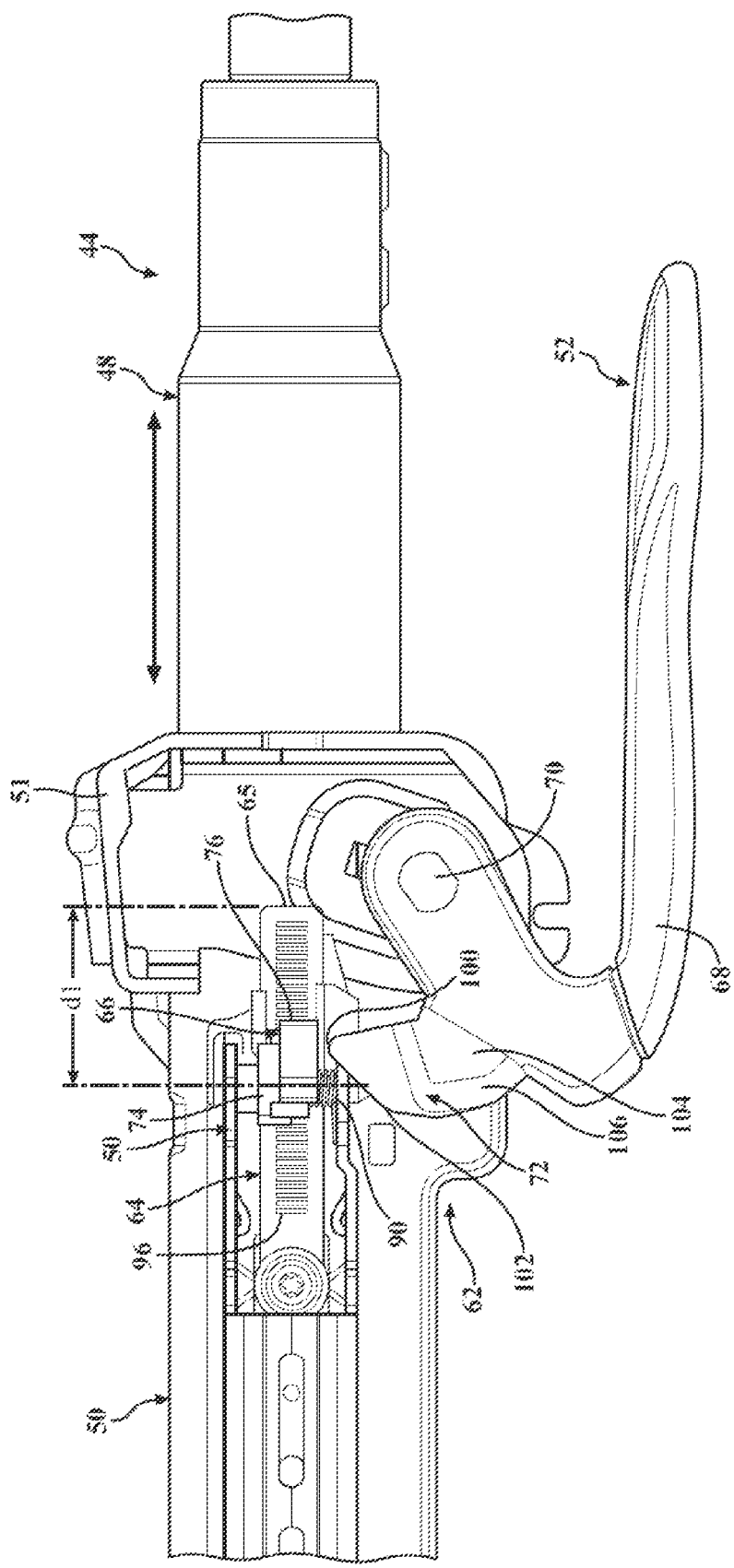
FIG. 2 illustrates a side view of the adjustable steering column assembly in a retracted position with an adjustment lever and a locking mechanism in a locked position.
Figure 3:
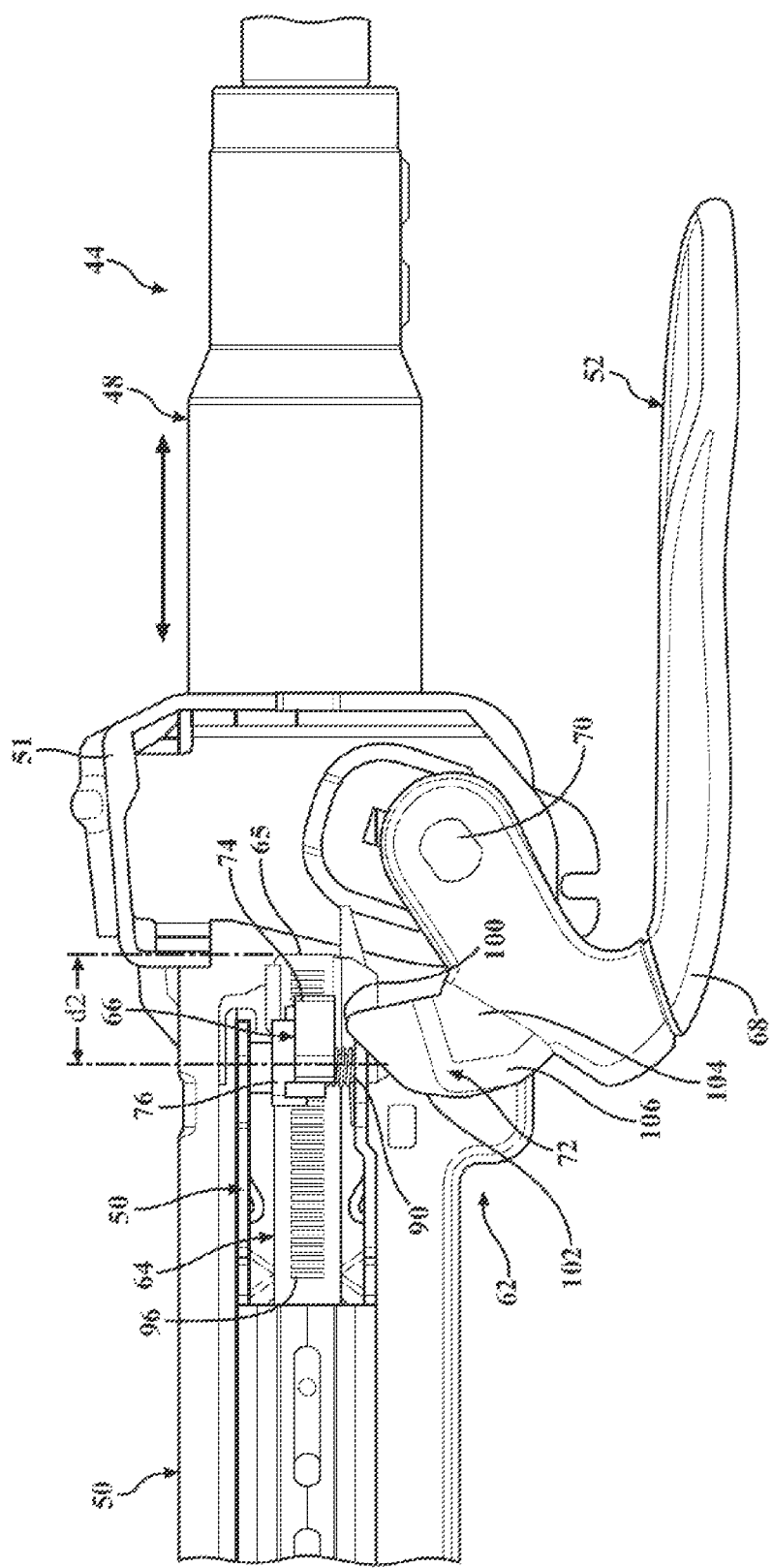
FIG. 3 illustrates a side view of the adjustable steering column assembly in an extended position with the adjustment lever and the locking mechanism in an unlocked position.
Figure 5:
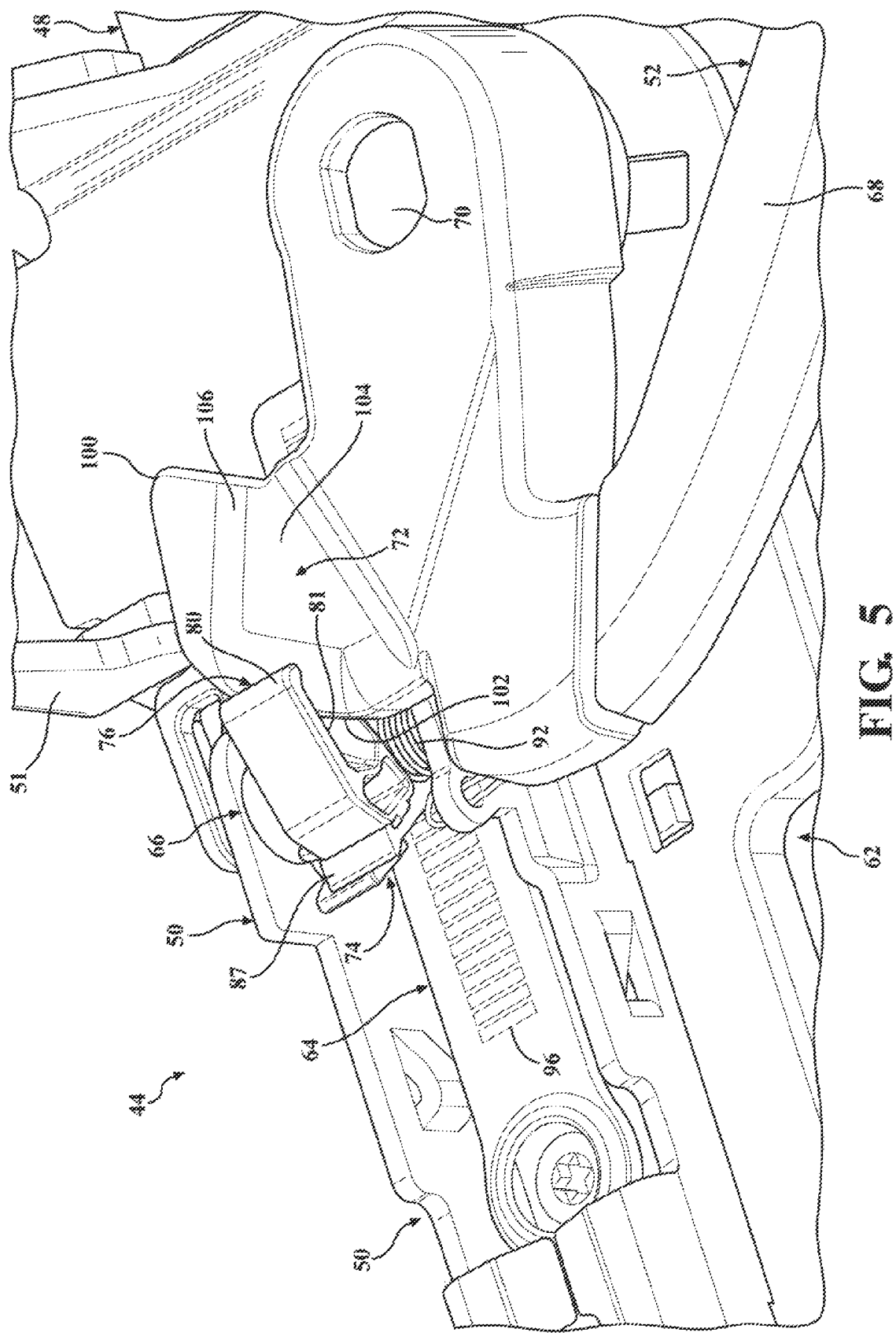
FIG. 5 illustrates an enlarged perspective view of the adjustment lever and the locking mechanism in the unlocked position.
Figure 6:
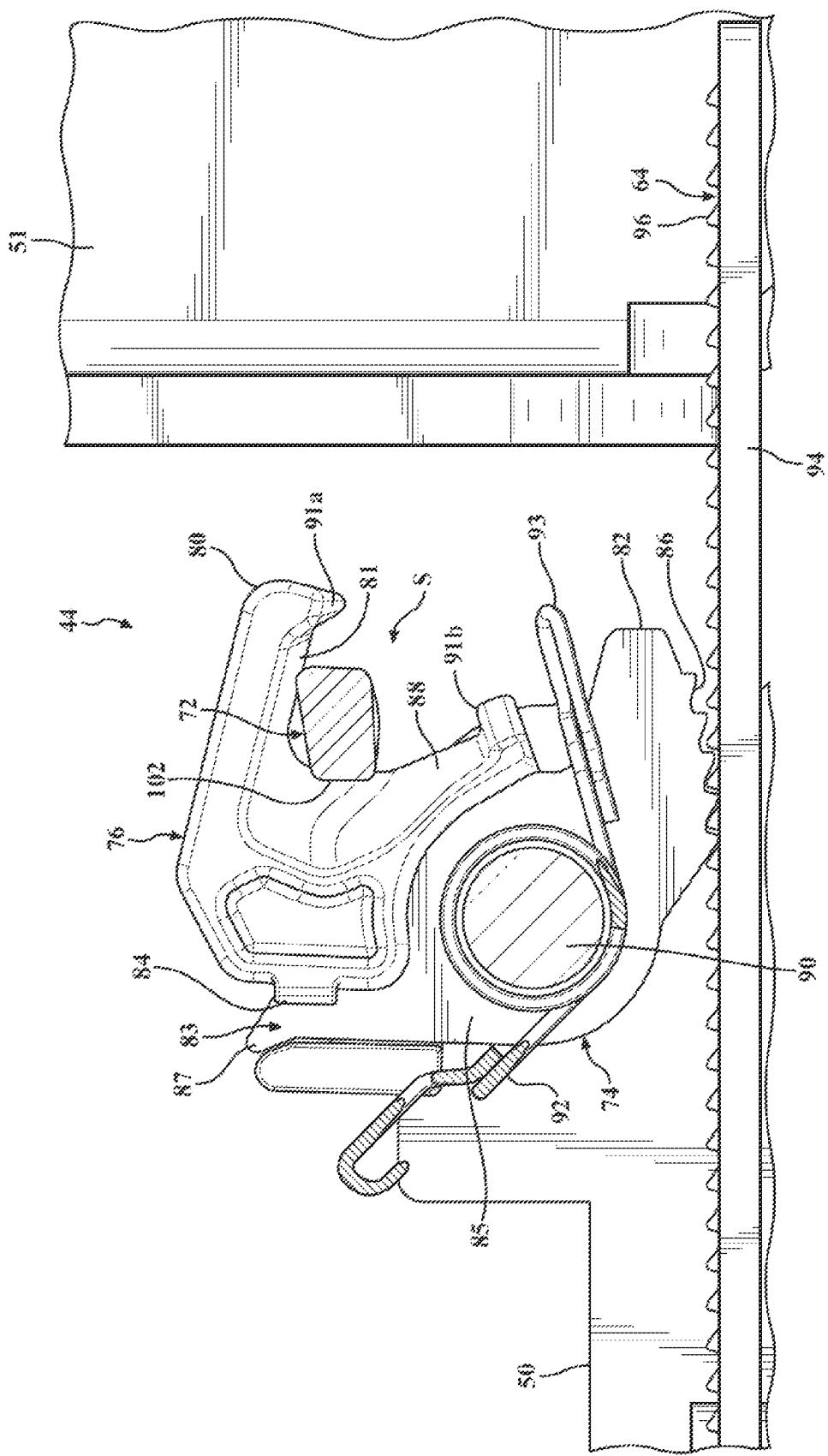
FIG. 6 illustrates a cross-sectional side view of the adjustment lever and the locking mechanism in the locked position.

FIGS. 2 and 3 generally illustrate the adjustable steering column assembly 44 with the adjustment lever 52 and a locking mechanism 62 in a locked position. The locking mechanism 62 includes an energy absorbing strap 64 and a locking cam 66 that are engaged in the locked position and spaced apart in an unlocked position (FIG. 5). The adjustable lever 52 includes a handle 68 that may include a U-shape and extends from a pivot end to a connection end that is connected to one of the jackets 48, 50 (e.g. the second jacket 50) with a pin 70. The pin 70 may connect the adjustable lever 52 to the bracket 51. The adjustable lever 52 includes a tab 72 located between the pivot end and the connection end and is spaced adjacently to the locking cam 66. In operation, as the adjustable lever 52 is rotated from a locked position (FIG. 2), wherein the steering column assembly 44 cannot be adjusted, to an unlocked position (FIG. 5), wherein the steering column assembly 44 can be adjusted, the tab 72 contacts the locking cam 66 and pushes the locking cam 66 out of engagement with the energy absorbing strap 64. As such, the adjustable lever 52 does not directly interface with the energy absorbing strap 64, but instead locks and unlocks the steering column assembly 44 with the locking cam 66, which is a separate component. In the unlocked position, movement of the steering column assembly 44 is permitted, where the upper jacket 48 may be movable relative to the lower jacket 50 along an axis A to move between the retracted position (FIG. 2) and the extended position (FIG. 3). For example, as shown in FIG. 2, the upper jacket 48 is shown in the retracted position, where a pin 90 extending through the locking cam 66 is spaced apart a first distance d1 from an end 65 of the strap 64. Once in the unlocked position, the upper jacket 48 may be moved to the extended position before the locking cam 66 locks the upper jacket 48 in place. As shown in FIG. 3, the upper jacket 48 is in the extended position, where the pin 90 is spaced apart a second distance d2 from the end 65 of the strap 64, where the second distance d2 is less than the first distance d1.

Figure 4:
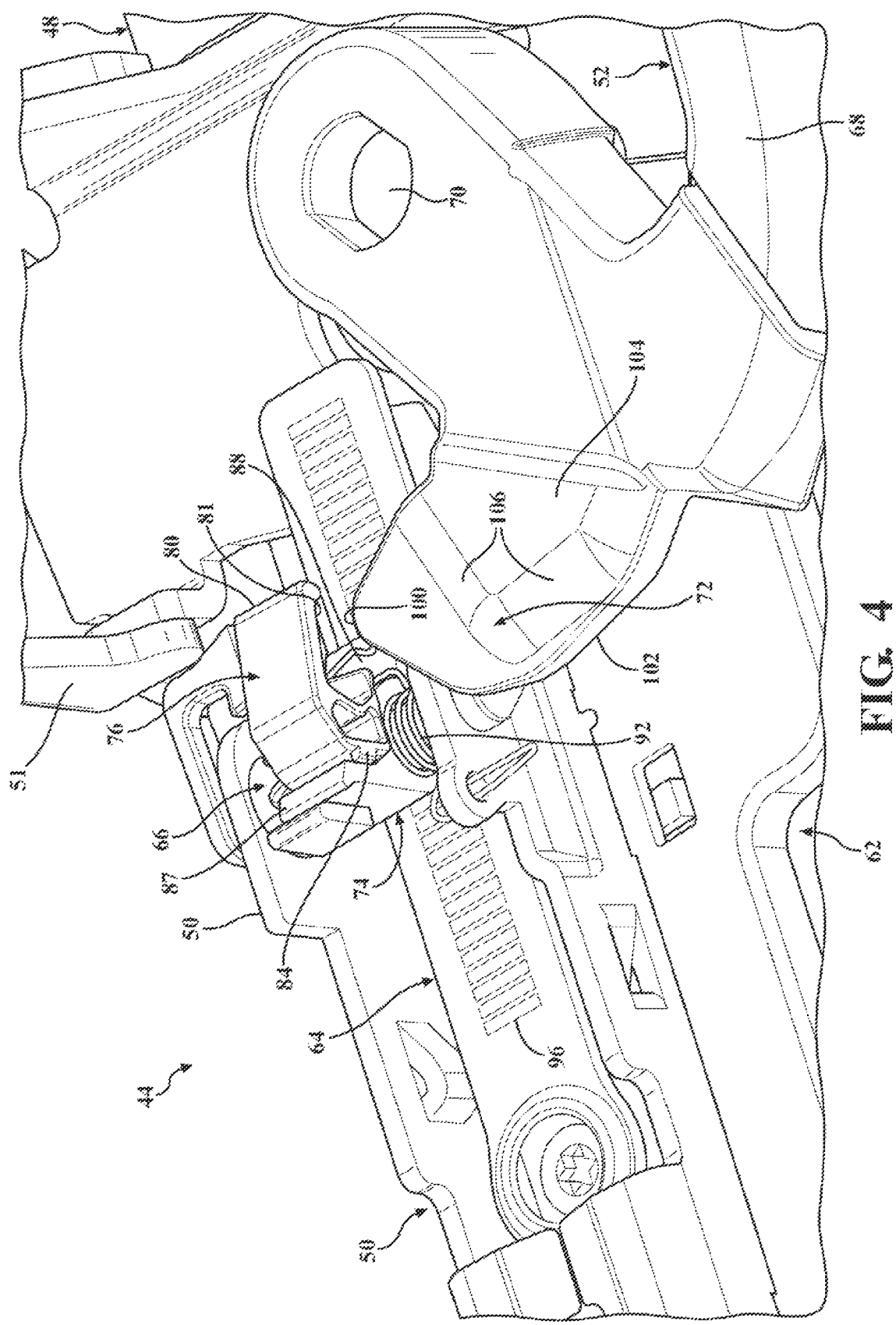
FIG. 4 illustrates an enlarged perspective view of the adjustment lever and the locking mechanism in the locked position.

FIGS. 4 and 5 generally illustrate the adjustment lever 52 and the locking mechanism 62 in greater detail. The locking cam 66 includes a hub portion 74 and a cam portion 76. It is to be understood that the hub portion 74 and the cam portion 76 are each independent, separately formed components that are coupled together. However, it is contemplated and possible that the hub portion 74 and the cam portion 76 may be formed together.

The hub portion 74 may include an upper arm 80 and a lower arm 88, the upper arm 80 having an interface surface 81 facing a first leg 82 of the cam portion 76, the interface surface 81 interfaces with the adjustment lever 52 to move the locking cam 66 between the locked position and the unlocked position. For example, the interface surface 81 is geometrically shaped and positioned to be pushed into and out of engagement with the tab 72. The hub portion 74 may define a channel 83 and include a tab 84 that extends partially across the channel 83 for coupling the hub portion 74 to the cam portion 76. In operation, the tab 72 may be spaced from the interface surface 81 in the locked position (FIG. 2) and may pivot into contact with the interface surface 81 as adjustable lever 52 is actuated (FIG. 3). As the tab 72 contacts the interface surface 78, the locking cam 66 is pivoted to the unlocked position.

The cam portion 76 may include a hub 85, the first leg 82, and a second leg 87. Each of the first leg 82 and the second leg 87 extend from the hub 85 in separate directions. The first leg 82 may extend from the hub 85 in a same direction as the upper arm 80 of the hub portion 74 to define a space S therebetween. The first leg 82 may define a set of teeth 86 for engaging teeth 96 on the strap 64. The second leg 87 of the cam portion 76 is positioned in the channel 83 with the tab 84 extending across to couple the hub portion 74 to the cam portion 76. The lower arm 88 may be positioned adjacent the first leg 82 such that the space S is further positioned between the upper arm 80 and the lower arm 88. Each of the upper arm 80 and the lower arm 88 may include extensions 91*a*, 91*b* that extend toward one another into the space S.

The cam portion 76 is operatively connected to the second jacket 50 by a pin 90 extending through the locking mechanism 66 to allow the locking mechanism 66 to pivot about the pin 90 between the locked position and the unlocked position. Each of the cam portion 76 and the hub portion 74 may include apertures that the pin 90 extends through the permit each of the cam portion 76 and the hub portion 74 to pivot. Therefore, the hub portion 74 and the cam portion 76 are each pivotable about the pin 90, i.e., the same axis.

The locking mechanism 62 may further include a biasing member 92 in contact with the locking cam 66 to rotatably bias the locking cam 66 into the locked position. The biasing member 92 may be a torsion spring that extends about and surrounds the pin 90. The biasing member 92 may include an arm 93 that extends away from the pin 90 to be positioned adjacent the extension to abut the extension of the lower arm 88 when the biasing member 92 is compressed. The biasing member 92 is compressed by the lower arm 88 of the cam portion 76 when the locking cam 66 is pivoted into the unlocked position, thereby biasing the locking cam 66 toward the locked position. The biasing force from the biasing member 92 pushes down on the first leg 82 of the cam portion 76, thus pushing the teeth 86 of the first leg 82 towards the axis A and into engagement with the teeth 96 on the energy absorbing strap 64.

The energy absorbing strap 64 defines the series of teeth 96 that are intermeshed with the tooth portion 86 in the locked position. During an impact event, the energy absorbing strap 64 dissipates at least some of the kinetic energy of collapsing first jacket 48 and the second jacket 50 (FIG. 2). For example, the energy absorbing strap 64 may include a first straight portion 94, a curved portion (not shown) at an end of the first straight portion 94 that enters into an opening of the second jacket 50 to a second straight portion (not shown) that connects to the first jacket 48. In this example, the strap 64 absorbs energy via relative pulling of the first straight portion 94 and the second straight portion and consequential rolling of the curved portion. However, in embodiments, the first straight portion 94 of the strap 64 may be coupled directly to the first jacket 48. Alternatively, in some embodiments, the teeth 96 may be located directly on the first jacket 48 or other components connected therewith. In any of the embodiments, the set of teeth 96 are coupled to the first jacket 48 to move axially with the first jacket 48 and, when in the locked position, are restricted from moving by the locking mechanism 66.

The adjustment lever 52 pivots about an axis defined by the pin 70 to move the locking mechanism 62 from the locked position to the unlocked position. The pin 70 may be pivotally coupled to the bracket 51 to pivotally couple the adjustment lever 52 to the bracket 51. The adjustment lever 52 moves along the axis to move the tab 72 toward the set of teeth 96. The tab 72 of the adjustment lever 52 extends into the space S between the upper arm and the leg of the locking mechanism 66 to contact the interface surface 81 and move the locking mechanism 66 from the locked position to the unlocked position. The tab 72 may include a tip 100, an edge 102 extending from the tip 100 to the handle 68 of the adjustment lever 52, an upper surface 104, and angled surface 106 extending obliquely from the upper surface 104 to the tip 100 and the edge 102, and may define a groove 108 in a lower surface 110 opposite the upper surface 104. The groove 108 spaces the lower surface 110 from the lower arm 88 of the cam portion 76 to prevent the lower arm 88 from being wedged between the pin 90 and the tab 72, thereby preventing the tab 72 from sticking to the cam portion 76. The edge 102 may extend from the tip 100 to the handle 68 to extend arcuately around the upper surface 104. The angled surface 106 extends from the tip 100 and the edge 102 to be oblique to the upper surface 104, such that the tip 100 and the edge 102 are positioned closer to the set of teeth 96 of the strap 64 than the upper surface 104.

Figure 7:
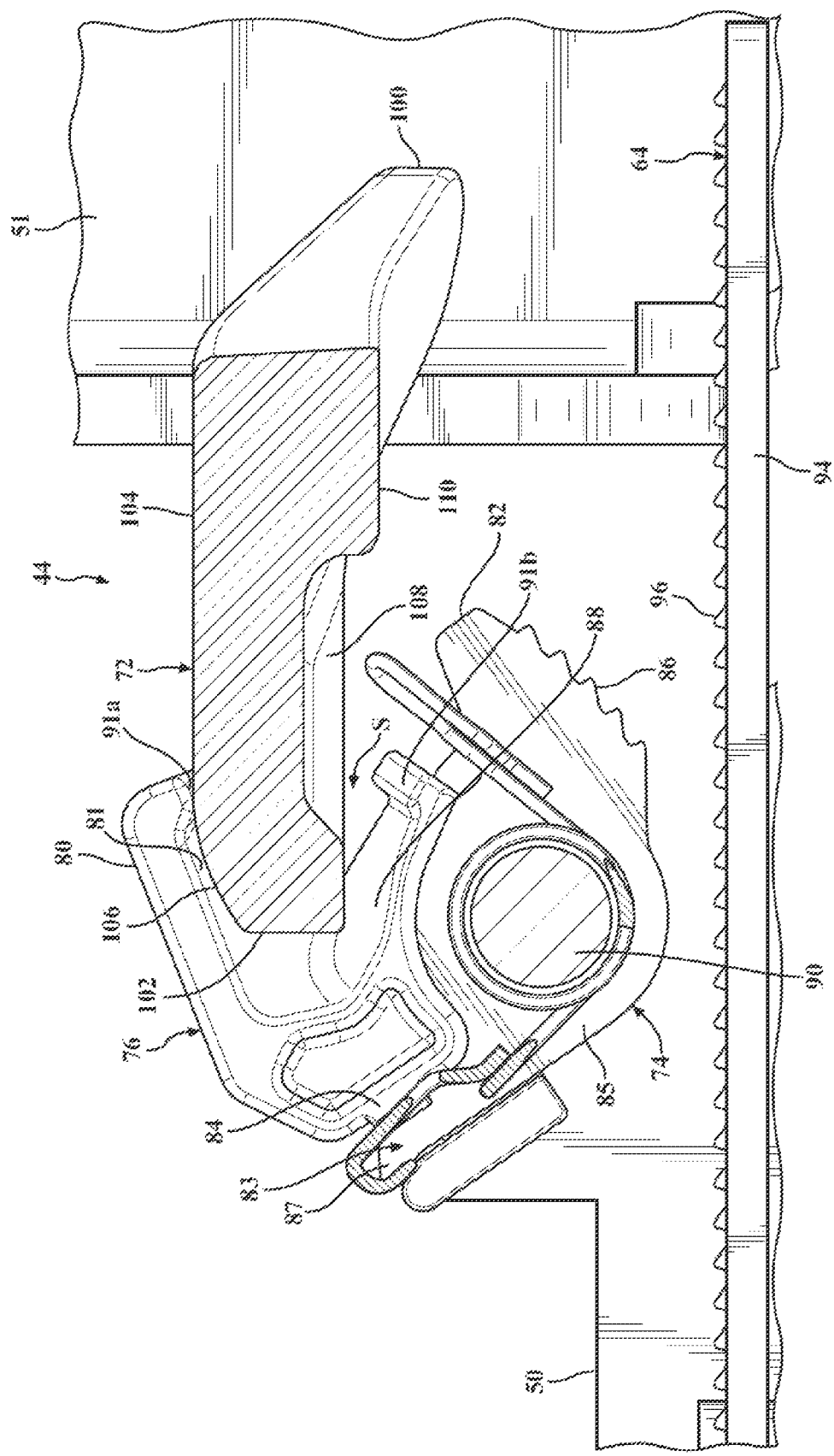
FIG. 7 illustrates a cross-sectional side view of the adjustment lever and the locking mechanism in the unlocked position.

When moving between the locked position and the unlocked position, the adjustment lever 52 moves along the axis defined by the pin 70 to move the tab 72 closer or further away from the teeth 96. In other words, the upper surface 104 of the tab 72 is spaced apart a first distance from the set of teeth 96 in the unlocked position that is greater than a second distance of the upper surface 104 from the set of teeth 96 in the locked position. A thickness of the tab 72 defined by a distance between the upper surface 104 and the lower surface 110 of the tab 72 is greater than a difference between the first distance and the second distance discussed above, such that, while the adjustment lever 52 moves closer to the teeth 96 when actuated, the change in thickness of the tab 72 along the angled surface 106 causes the tab 72 to contact the locking mechanism 66 and move the upper arm 80 of the cam portion 74 away from the teeth 96, moving the locking mechanism 66 to the unlocked position. As shown in FIGS. 5 and 7, when moving from the locked position to the unlocked position, the interface surface 81 of the upper arm 80 contacts the angled surface 106 and moves along the angled surface 106 toward the upper surface 104 of the tab 72, pivoting the locking mechanism 66 toward the unlocked position. The shape and the rotational and axial movement of the tab 72 results in force vectors that efficiently transfer movement of the tab 72 to the locking mechanism 66. Particularly, the shape and movement of the tab 72 contacts and moves the locking mechanism 66 at the upper arm 80 of the cam portion 74 to use the cam portion 74 as a lever arm, rotating the locking mechanism 66 into the unlocked position with minimal resistance.

Figure 8:
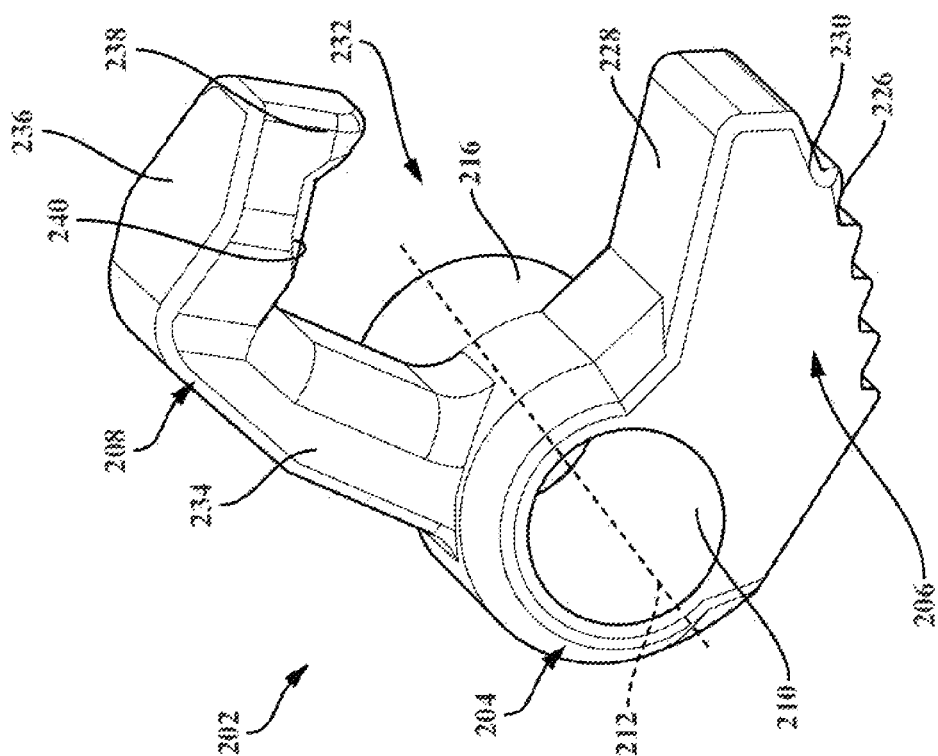
FIG. 8 illustrates a perspective view of an alternative locking cam of an alternative locking mechanism.
Figure 9:
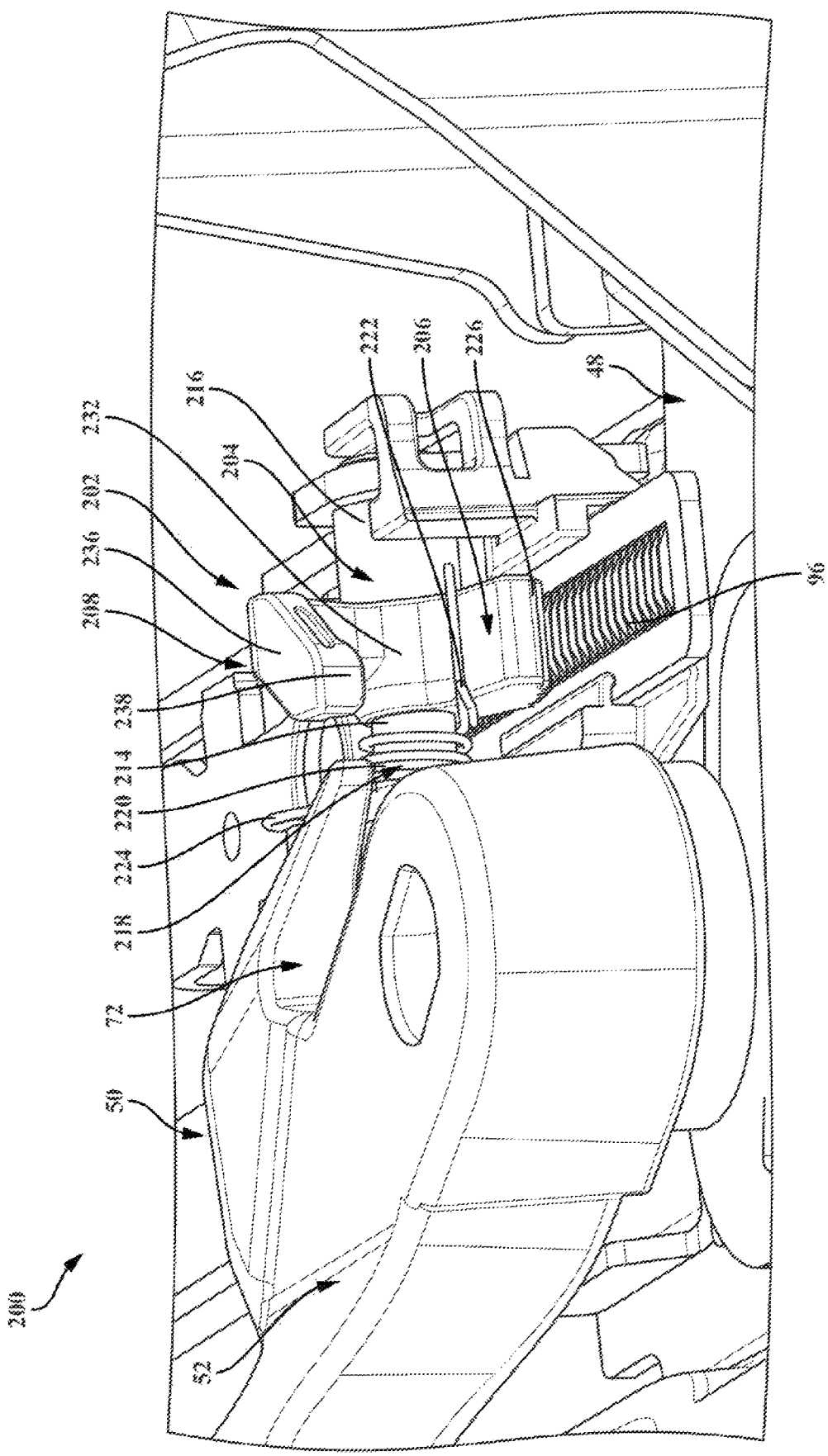
FIG. 9 illustrates a partial perspective view of an adjustable steering column assembly with the alternative locking cam in a locked position.
Figure 10:
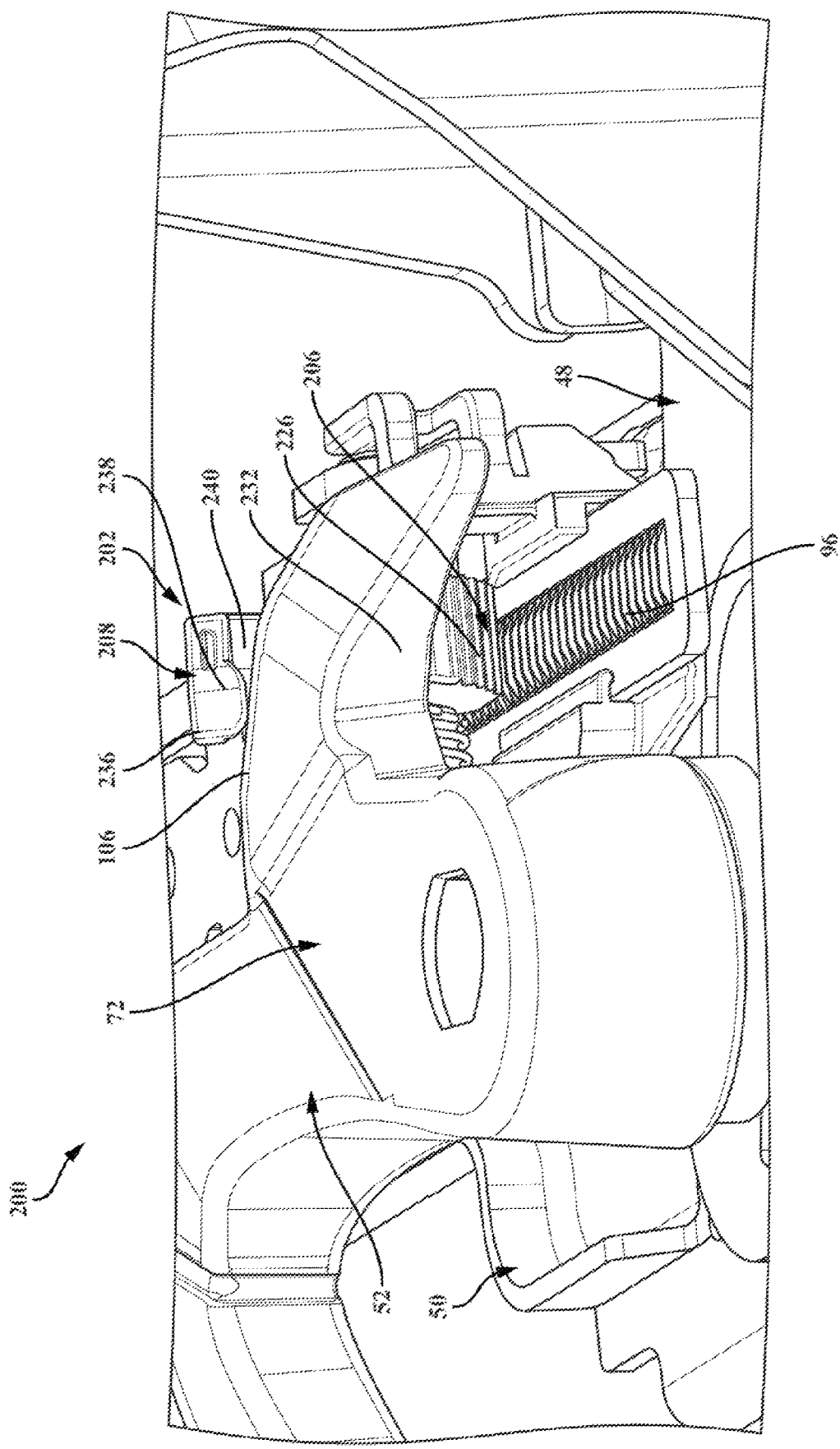
FIG. 10 illustrates a partial perspective view of the adjustable steering column assembly with the alternative locking cam in an unlocked position.

Referring to FIGS. 8-10, an alternative steering column assembly 200 with an alternative locking cam 202 is depicted. The alternative steering column assembly 200 includes similar function and components to the steering column assembly 44 described above, and like function and components will not be described again for brevity. The alternative locking cam 202 may include a hub 204, a leg 206, and an arm 208 similar to the hub 74, the leg 82, and the upper arm 80 described above. Each of the hub 204, the leg 206, and the arm 208 may be formed of a single, monolithic one-piece structure.

Referring to FIG. 8, the hub 204 defines an opening 210 extending along an axis 212 for receiving a pin 214 (FIGS. 9 and 10) and to allow the locking cam 202 to pivot about the pin 214 (FIGS. 9 and 10). The hub 204 may include a cylindrical extension 216 extending away from the arm 208 and the leg 206 with the opening 210 extending through the cylindrical extension 216. The cylindrical extension 216 is configured to receive the biasing member 218 (FIGS. 9 and 10), where the biasing member 218 may include a torsion spring with a cylindrical portion 220 that circumferentially surrounds the cylindrical extension 216, a first arm 222 extending into the space to contact the leg 206 between the leg 206 and the arm 208 to be configured to pivot the hub 204 around the pin 214, and a second arm 224 that contacts one of the jackets 48, 50 (FIGS. 9 and 10). When the locking cam 202 moves between the locked position and the unlocked position, the first arm 222 of the biasing member 218 is moved toward the second arm 224 through contact with the leg 206, thereby compressing the biasing member 218 and biasing the locking cam 202 toward the locked position.

The leg 206 may define a set of teeth 226 for engaging the set of teeth 96 (FIGS. 9 and 10) of the axially adjustable steering column when the locking cam 202 is in the locked position. The leg 206 may extend from the hub 204 in a first direction, and may include a first surface 228 facing the arm 208 and a second surface 230 opposite the first surface 228. As shown in FIGS. 9 and 10, the first arm 222 of the biasing member 218 contacts the first surface 228 of the leg 206, and the set of teeth 226 of the leg 206 are defined on the second surface 230.

Referring again to FIG. 8, the arm 208 may extend from the hub 204 at least partially in the first direction with the leg 206 to define a space 232 between the arm 208 and the leg 206. The arm 208 may include a primary extension 234 extending from the hub 204, a secondary extension 236 extending from the primary extension 234 that extends obliquely from the primary extension 234 to extend partially along the axis 212 and perpendicular to the primary extension 234 when viewed along the axis 212, and a tertiary extension 238 extending from the secondary extension 236 toward the leg 206 and into the space 232 between the arm 208 and the leg 206. The arm 208 and the leg 206 may extend from the hub 204 such that the locking cam 202 is substantially C-shaped when viewed along the axis 212 to partially surround the space 232 between the leg 206 and the arm 208. The arm 208 may further include an interface surface 240 that faces the leg 206 to be configured to interface with a mechanism of the adjustable steering column, such as the adjustment lever 52 (FIG. 9), to pivot the locking cam 202 to move between a locked position (FIG. 9) and an unlocked position (FIG. 10).

Referring to FIGS. 9 and 10, the steering column assembly 200 operates substantially similarly to the steering column assembly 44 described above, and operation will only be briefly discussed for brevity. As shown in FIG. 9, the steering column assembly 200 is depicted in the locked position with the biasing member 218 biasing the teeth 226 on the leg 206 of the locking cam 202 into engagement with the teeth 96 of the axially adjustable steering column 200. The mesh between the sets of teeth 226, 96 restricts axially movement of the jackets 48, 50 relative to one another. To permit movement between the jackets 48, 50, the steering column assembly 200 may be moved into the unlocked position (FIG. 10) by actuating the adjustment lever 52, moving the tab 72 into the space 232 between the arm 208 and the leg 206 of the locking cam 202 with contact between the tab 72 and at least the secondary extension 236 and tertiary extension 238 of the arm 208, thereby overcoming the biasing force of the biasing member 218 and pivoting the locking cam 202 about the pin 214 into the unlocked position.

As shown in FIG. 10, the steering column assembly 200 is depicted in the unlocked position with the teeth 226 of the locking cam 202 spaced apart from the teeth 96 of the steering column 200. In this position, the jackets 48, 50 may be moved relative to one another to permit a position of the steering wheel to be adjusted. Further, in the unlocked position, the interface surface 240 on the secondary extension 236 and the tertiary extension 238 contact the angled surface 106 of the tab 72 to allow the tab 72 to hold the locking cam 202 in position.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation to encompass all such modifications and equivalent structure as is permitted under the law.

What is claimed is:

1. A locking mechanism for an axially adjustable steering column having an adjustment lever, the locking mechanism comprising:
   a locking cam comprising a hub defining an opening extending around an axis, a leg extending from the hub in a first direction, the leg defining a set of teeth, and an arm extending from the hub at least partially in a direction of extension of the axis to define a space between the arm and the leg, the arm comprising an interface surface facing the leg, the interface surface interfacing with the adjustment lever to move the locking cam between a locked position and an unlocked position, and each of the hub, the arm, and the leg are formed of a single, monolithic one-piece structure; and
   a pin extending through the opening in the hub to allow the locking cam to pivot about the pin between the locked position and the unlocked position,
   in the locked position, the set of teeth of the leg engage with a set of teeth of the axially adjustable steering column, and
   in the unlocked position, the set of teeth of the leg are spaced apart from the set of teeth of the axially adjustable steering column,
   wherein the arm comprises an extension that extends into the space toward the leg,
   wherein the arm further comprises a primary extension extending from the hub, a secondary extension extending obliquely from the primary extension to extend partially along the axis, and a tertiary extension extending from the secondary extension that is the extension that extends into the space toward the leg.

2. The locking mechanism of claim 1, wherein the hub, the leg, and the arm partially surround the space between the leg and the arm.

3. The locking mechanism of claim 1, further comprising a biasing member circumferentially surrounding the pin and contacting the leg to be configured to pivot the hub around the pin.

4. The locking mechanism of claim 3, wherein the biasing member extends into the space to contact the leg between the arm and the leg.

5. The locking mechanism of claim 4, wherein the biasing member comprises a torsion spring.

* * * * *